(12) United States Patent
Babinsky et al.

(10) Patent No.: US 8,389,079 B2
(45) Date of Patent: Mar. 5, 2013

(54) PAPERBOARD-BASED BEVERAGE CONTAINER

(75) Inventors: Vladislav A. Babinsky, Fuquay Varina, NC (US); Sven S. Arenander, Richmond, VA (US); Dobbie C. Newman, Glen Allen, VA (US); Teresa Krug, Henrico, VA (US)

(73) Assignee: MeadWestvaco Corporation, Richmond, VA (US)

( * ) Notice: Subject to any disclaimer, the term of this patent is extended or adjusted under 35 U.S.C. 154(b) by 0 days.

(21) Appl. No.: 13/318,380

(22) PCT Filed: May 5, 2010

(86) PCT No.: PCT/US2010/033658
§ 371 (c)(1),
(2), (4) Date: Nov. 1, 2011

(87) PCT Pub. No.: WO2010/129633
PCT Pub. Date: Nov. 11, 2010

(65) Prior Publication Data
US 2012/0043373 A1 Feb. 23, 2012

Related U.S. Application Data

(60) Provisional application No. 61/175,569, filed on May 5, 2009, provisional application No. 61/287,990, filed on Dec. 18, 2009.

(51) Int. Cl.
*B29D 22/00* (2006.01)
(52) U.S. Cl. .................. 428/34.2; 229/122.32; 493/115
(58) Field of Classification Search .............. 428/34.2; 493/115; 229/122.32; 220/441
See application file for complete search history.

(56) References Cited

U.S. PATENT DOCUMENTS

| 5,539,035 | A | * | 7/1996 | Fuller et al. .................... 524/322 |
| 6,042,672 | A | | 3/2000 | Kishine et al. |
| 6,135,346 | A | * | 10/2000 | Drummond et al. ........... 229/4.5 |
| 6,277,454 | B1 | | 8/2001 | Neale et al. |
| 6,295,600 | B1 | * | 9/2001 | Parady .......................... 712/228 |
| 6,811,843 | B2 | | 11/2004 | DeBraal et al. |
| 6,852,381 | B2 | | 2/2005 | DeBraal et al. |

(Continued)

FOREIGN PATENT DOCUMENTS

| DE | 1 946 236 A1 | 3/1971 |
| EP | 1 002 731 A1 | 5/2000 |

(Continued)

OTHER PUBLICATIONS

The international preliminary report on patentability for the parent PCT patent application, PCT/US2009/043891, dated Nov. 25, 2010.

(Continued)

*Primary Examiner* — N. Edwards
(74) *Attorney, Agent, or Firm* — Walters & Wasylyna LLC (57) ABSTRACT

A container including at least one wall that defines an internal volume and an opening into the internal volume, the wall defining an internal surface and an external surface and being formed as a layered structure that includes a first layer, a second layer that includes paperboard and defines the external surface, and an adhesive layer disposed between the first layer and the second layer, wherein at most 0.15 grams of surface condensation forms on the wall per 300 square centimeters of the external surface during a 20-minute interval, the 20-minute interval beginning upon filling 75 percent of the internal volume with a liquid maintained at a temperature of about 32° F. while the filled container is exposed to an ambient temperature of about 73° F. and about 50 percent relative humidity.

47 Claims, 6 Drawing Sheets

U.S. PATENT DOCUMENTS

| | | |
|---|---|---|
| 7,811,644 B2 | 10/2010 | DeBraal et al. |
| 2007/0204965 A1 | 9/2007 | Linhart et al. |
| 2010/0187296 A1 | 7/2010 | Puls et al. |
| 2012/0043373 A1* | 2/2012 | Babinsky et al. ........ 229/122.32 |

FOREIGN PATENT DOCUMENTS

| | | |
|---|---|---|
| EP | 1 438 072 B1 | 5/2008 |
| JP | 11-131396 A | 5/1999 |

OTHER PUBLICATIONS

The international preliminary report on patentability for the parent PCT patent application, PCT/US2010/033653, dated Sep. 7, 2010.

The international preliminary report on patentability for the parent PCT patent application, PCT/US2010/033658, dated Mar. 15, 2011.

* cited by examiner

PAPERBOARD-BASED BEVERAGE CONTAINER

PRIORITY

This application claims priority from U.S. Ser. No. 61/175,569 filed on May 5, 2009 and U.S. Ser. No. 61/287,990 filed on Dec. 18, 2009, the entire contents of which are incorporated herein by reference.

FIELD

This application relates to paperboard-based beverage containers, such as beverage cups, and, more particularly, to insulated paperboard-based beverage containers and, even more particularly, to insulated paperboard-based beverage containers that reduce or eliminate condensate formation.

BACKGROUND

Beverage containers, such as beverage cups, are used to hold various beverages, including cold beverages, such as soda and iced tea, and hot beverages, such as coffee and tea. Cold beverages are typically served with ice and, due to humidity in the ambient air, result in the formation of water droplets (i.e., condensation) on the external surface of the beverage container. Such condensation inhibits the user's ability to securely grip the beverage container, which may result in accidental spillage, particularly when the beverage is being consumed while operating a motor vehicle. Furthermore, the formation of condensation on the external surface of beverage containers may result in the undesirable pooling of condensate on the surface supporting the beverage container, thereby potentially damaging the surface.

Accordingly, those skilled in the art continue to innovate in the field of beverage containers.

SUMMARY

In one aspect, the disclosed beverage container may include at least one wall that defines an internal volume and an opening into the internal volume, the wall defining an internal surface and an external surface and being formed as a layered structure that includes a first layer, a second layer that includes paperboard and defines the external surface, and an adhesive layer disposed between the first layer and the second layer, wherein at most 0.15 grams of surface condensation forms on the external surface per 300 square centimeters of the external surface during a 20-minute interval, the 20-minute interval beginning upon filling 75 percent of the internal volume with a liquid maintained at a temperature of about 32° F. while the filled container is exposed to an ambient temperature of about 73° F. and about 50 percent relative humidity.

In another aspect, the disclosed beverage container may include at least one wall that defines an internal volume and an opening into the internal volume, the wall defining an internal surface and an external surface and being formed as a layered structure that includes a first layer, a second layer that includes paperboard and defines the external surface, and an adhesive layer disposed between the first layer and the second layer, wherein at most 0.4 grams of surface condensation forms on the external surface per 300 square centimeters of the external surface during a 40-minute interval, the 40-minute interval beginning upon filling 75 percent of the internal volume with a liquid maintained at a temperature of about 32° F. while the filled container is exposed to an ambient temperature of about 73° F. and about 50 percent relative humidity.

In another aspect, the disclosed beverage container may include at least one wall that defines an internal volume and an opening into the internal volume, the wall defining an internal surface and an external surface and being formed as a layered structure that includes a first layer, a second layer that includes paperboard and defines the external surface, and an adhesive layer disposed between the first layer and the second layer, wherein at most 0.3 grams of surface condensation forms on the external surface per 300 square centimeters of the external surface during a 20-minute interval, the 20-minute interval beginning 20 minutes after filling 75 percent of the internal volume with a liquid maintained at a temperature of about 32° F. while the filled container is exposed to an ambient temperature of about 73° F. and about 50 percent relative humidity.

In another aspect, the disclosed container may include at least one wall that defines a vertical axis, an internal volume and an opening into the internal volume, the wall defining an internal surface and an external surface, wherein at most 0.5 grams of surface condensation forms on the external surface per 300 square centimeters of the external surface during a 2 hour interval, the 2 hour interval beginning upon filling 75 percent of the internal volume with a liquid maintained at a temperature of about 32° F. while the filled container is exposed to an ambient temperature of about 73° F. and about 50 percent relative humidity, and wherein the container has a compression force of at least 2.5 pounds immediately after the 2 hour interval, the compression force being measured at 5 percent deformation in a direction perpendicular to the vertical axis.

In yet another aspect, the disclosed method for making a beverage container may include the steps of (1) providing a first layer of paperboard and a second layer of paperboard, (2) positioning an adhesive material between the first and second layers to form a layered structure, the adhesive material having a pseudoplasticity index in the range of about 0.3 to about 0.5, (3) shaping the layered structure to define an internal volume and an opening into the internal volume, the layered structure having an internal surface and an external surface, and (4) drying the adhesive material, wherein at most 0.15 grams of surface condensation forms on the external surface per 300 square centimeters of the external surface during a 20-minute interval, the 20-minute interval beginning upon filling 75 percent of the internal volume with a liquid maintained at a temperature of about 32° F. while the filled container is exposed to an ambient temperature of about 73° F. and about 50 percent relative humidity.

Other aspects of the disclosed paperboard-based beverage container will become apparent from the following description, the accompanying drawings and the appended claims.

DETAILED DESCRIPTION

Figure 1:
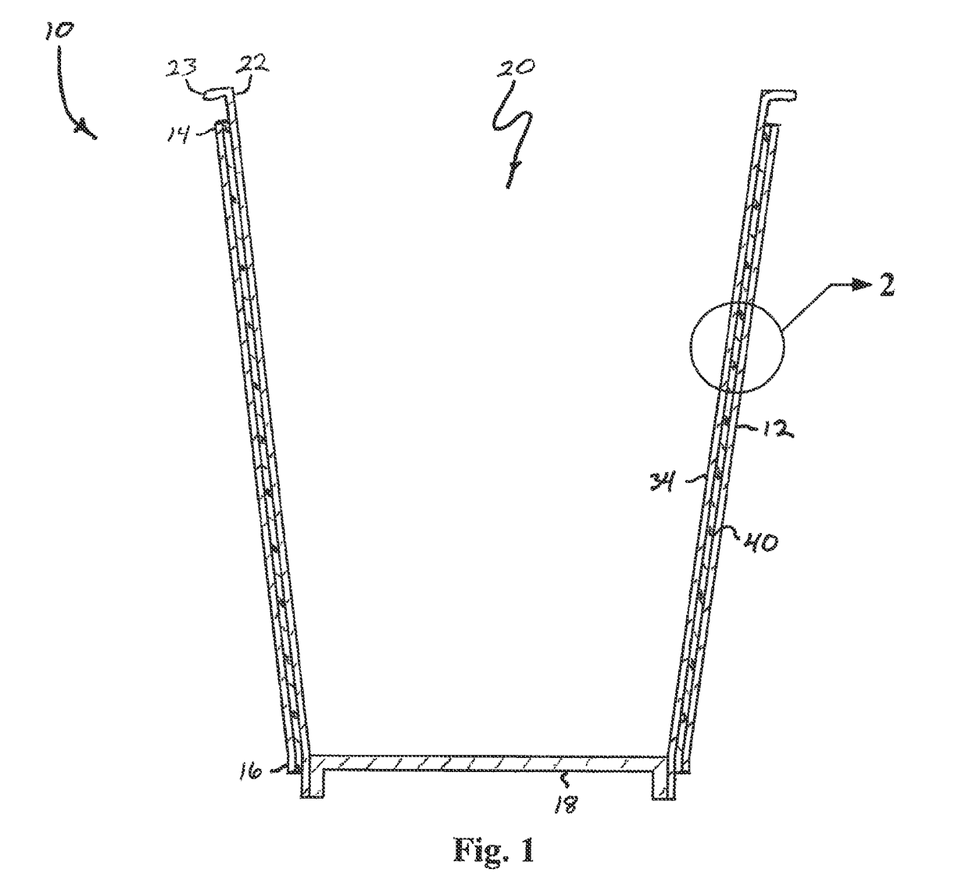
FIG. 1 is a front elevational view, in section, of one aspect of the disclosed paperboard-based beverage container.

Referring to FIG. 1, one aspect of the disclosed paperboard-based beverage container, generally designated 10, may be formed as a cup, such as a 12-ounce, 16-ounce, 21-ounce or 24-ounce disposable take-out cup. The beverage container 10 may include a frustoconical side wall 12 having an upper end portion 14 and a lower end portion 16, and a bottom wall 18 connected to the lower end portion 16 to define an internal volume 20 within the beverage container 10. The upper end portion 14 of the side wall 12 may define an opening 22 into the internal volume 20. Optionally, the upper end portion 14 of the side wall 12 may additionally include a lip 23 for securing a lid (not shown) or the like to the beverage container 10.

Those skilled in the art will appreciate that the disclosed beverage container 10 may be formed in various shapes and sizes, and may be formed with fewer or more walls than the side and bottom walls 12, 18 discussed above, without departing from the scope of the present disclosure.

Figure 2:
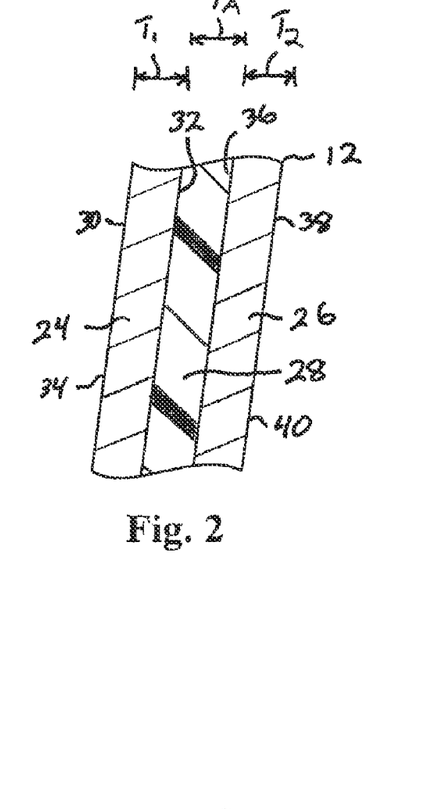
FIG. 2 is a cross-sectional view of a portion of the side wall of the beverage container of FIG. 1.

As shown in FIG. 2, the side wall 12 may be formed as a layered structure having a first layer 24, a second layer 26 and an adhesive layer 28. The first layer 24 may include an inner surface 30 and an outer surface 32, wherein the inner surface 30 of the first layer 24 may define (or may be proximate) the interior surface 34 of the beverage container 10. The second layer 26 may include an inner surface 36 and an outer surface 38, wherein the outer surface 38 of the second layer 26 may define the external surface 40 of the beverage container 10.

In one aspect, the adhesive layer 28 may be positioned between the first and second layers 24, 26 such that the adhesive layer 28 is connected to both the outer surface 32 of the first layer 24 and the inner surface 36 of the second layer 26. In another aspect, optional additional layers (not shown) may be positioned between the first layer 24 and the adhesive layer 28, such that the adhesive layer 28 may be connected to the inner surface 36 of the second layer 26 and the outer surface (not shown) of one of the optional additional layers.

Figure 3:
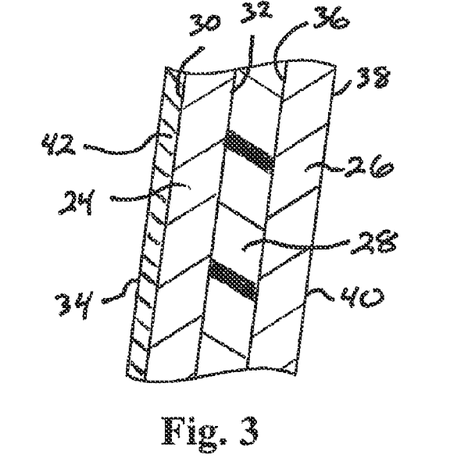
FIG. 3 is a cross-sectional view of a portion of a side wall of a beverage container in accordance with one alternative aspect of the disclosure.

As shown in FIG. 3, in one optional aspect, the inner surface 30 of the first layer 24 may be coated with a moisture barrier layer 42, thereby rendering the interior surface 34 of the side wall 12 of the beverage container 10 resistant to moisture penetration when the internal volume 20 of the beverage container 10 is filled with a beverage (not shown). For example, the moisture barrier layer 42 may be (or may include) a layer of polyethylene that has been laminated, extrusion coated or otherwise connected (e.g., adhesives) to the inner surface 30 of the first layer 24. Other moisture barrier materials useful in the moisture barrier layer 42 are known in the art and commercially available.

The first layer 24 may be a sheet of material capable of being shaped into the side wall 12. The first layer 24 may have a thickness $T_1$ and rigidity sufficient to impart the beverage container 10 with sufficient structural integrity to maintain the desired shape of the beverage container 10 when a beverage is received in the internal volume 20. For example, the first layer 24 may be formed from a recyclable material, such as paperboard, or from a polymeric material, such as polycarbonate or polyethylene terephthalate, and may have a thickness of at least about 6 points, such as about 8 to about 24 points.

The second layer 26 may be formed from a sheet of paperboard, which may be bleached or unbleached, and which may have a basis weight of at least about 85 pounds per 3000 square feet and a thickness $T_2$ of at least about 6 points. For example, the second layer 26 may be formed from paperboard, such as linerboard or solid bleached sulfate (SBS), having a basis weight ranging from about 180 to about 270 pounds per 3000 square feet and a thickness $T_2$ ranging from about 8 to 36 points.

At this point, those skilled in the art will appreciate that the paperboard used to form the second layer 26 may include various components and optional additives in addition to cellulosic fibers. For example, the second layer 26 may optionally include one or more of the following: binders, fillers, organic pigments, inorganic pigments, hollow plastic pigments, expandable microspheres and bulking agents, such as chemical bulking agents.

In one optional aspect, the paperboard used to form the second layer 26 may include ground wood particles dispersed therein. Without being limited to any particular theory, it is believed that the ground wood particles in the second layer 26 encourage the absorption of condensation that is formed on the external surface 40 into the second layer 26 and the adhesive layer 28.

In another optional aspect, the outer surface 38 of the second layer 26 may be textured to improve the gripping ability of the external surface 40 of the beverage container 10, as well as the moisture absorbing properties of the container 10. One technique for texturing the outer surface 38 includes embossing the outer surface 38. While a skilled artisan can perceive various texture patterns, examples of useful texture/embossing patterns include checkered patterns, consecutive horizontal lines, consecutive vertical lines, and consecutive lines disposed at a non-right angle relative to the vertical axis of the beverage container 10.

Thus, those skilled in the art will appreciate that the external surface 40 of the container 10 may have various features, shapes, contours and configurations without departing from the scope of the present disclosure.

The second layer 26 may be engineered to maximize the transfer of moisture (i.e., condensation) forming on the external surface 40 of the side wall 12 into the second layer 26 and the adhesive layer 28 of the side wall 12. For example, the surface sizing and the porosity of both the inner and outer surfaces 36, 38 of the second layer 26 may be engineered to maximize moisture (i.e., condensation) absorption and minimize the negative effects of condensate formation.

In one particular aspect, the surface sizing of the inner and outer surfaces 36, 38 of the second layer 26 may be controlled such that the inner surface 36 has a Hercules sizing that is less than the Hercules sizing of the outer surface 38. For example, the surface sizing of the inner and outer surfaces 36, 38 of the second layer 26 may be controlled such that the inner surface 36 has a sizing in the range from about 30 to about 80 Hercules units, while the outer surface 38 has a sizing in the range from about 100 to about 150 Hercules units.

In another particular aspect, the porosities of the inner and outer surfaces 36, 38 of the second layer 26 may be controlled such that the inner surface 36 has a Gurley porosity that is less than the Gurley porosity of the outer surface 38 (i.e., greater pore volume on the inner surface 36 and on the outer surface 38). For example, the porosities of the inner and outer surfaces 36, 38 of the second layer 26 may be controlled such that the inner surface 36 has a porosity of about 20 Gurley units (400 cc test), while the outer surface 38 has a porosity of about 40 Gurley units (400 cc test).

At this point, those skilled in the art will appreciate that surface sizing may be controlled using various sizing agents, such as alkyl ketene dimer. Furthermore, those skilled in the art will appreciate that other properties pertaining to moisture absorption, such as porosity, can be achieved by modifying the paperboard making process, such as modifying the selection of the forming, pressing and drying fabrics.

Accordingly, by modifying the surface sizing and porosity of both the inner and outer surfaces 36, 38 of the second layer 26, the rate of moisture absorption can be controlled. For example, moisture absorption rates of 0.02 to 0.1 g/cm$^2$/min at the outer surface 38 and 0.03 to 0.2 g/cm$^2$/min at the inner surface 36 may be achieved.

As noted above, the outer surface 38 of the second layer 26 may be embossed, thereby providing additional surface area for condensate absorption. For example, the topography of the embossed surface may be configured such that the area of finger contact with the embossed surface is 20 percent of the total surface of the container 10 under fingers. The shape of the embossed recesses may be designed in such a way that the porosity on the picks of the embossed structure is 30 percent greater than in the valleys of the embossed structure. The increased porosity may occur because of a designed concentration of stresses in the peak areas of the embossed structure, while a greater curvature of the picks results in lower porosity of the pick area.

The adhesive layer 28 may be a layer of thermally insulative material that couples the second layer 26 to the underlying layer (e.g., the first layer 24). The thickness $T_A$ of the adhesive layer 26 may range from about 0.05 millimeters to about 5 millimeters. Of course, those skilled in the art will appreciate that a greater thickness $T_A$ may be used when greater insulation is desired.

The adhesive layer 28 may be deemed thermally insulating if it has an insulative R-value per unit of thickness that is greater than the insulative R-value per unit of thickness of the second layer 26. For example, the ratio of the insulative R-value per unit of thickness of the adhesive layer 28 to the insulative R-value per unit thickness of the second layer 26 may be at least about 1.25:1, such as 1.5:1, 2:1 or even 3:1.

The adhesive layer 28 may cover all, or only a portion, of the inner surface 36 of the second layer 26. As one example, the adhesive layer 28 may cover about 20 to about 100 percent of the surface area of the inner surface 36 of the second layer 26. As another example, the adhesive layer 28 may cover about 20 to about 80 percent of the surface area of the inner surface 36 of the second layer 26. As yet another example, the adhesive layer 28 may cover about 40 to about 60 percent of the surface area of the inner surface 36 of the second layer 26. As yet another example, the adhesive layer 28 may cover about 50 percent of the surface area of the inner surface 36 of the second layer 26.

When the adhesive layer 28 covers less than all of the inner surface 36 of the second layer 26, the adhesive layer 28 may be applied to the inner surface 36 either randomly or in various patterns. Those skilled in the art will appreciate that certain patterns, such as vertical strips (either straight or wavy), may increase the overall structural integrity of the beverage container 10.

In one aspect, the adhesive layer 28 may be formed as a composite material that includes an organic binder and a filler. The organic binder may comprise 15 to 70 percent by weight of the adhesive layer 28 and the filler may comprise 2 to 70 percent by weight of the adhesive layer 28.

The organic binder of the composite adhesive layer 28 may be any material, mixture or dispersion capable of bonding the second layer 26 to the underlying layer (e.g., the first layer 24). The organic binder may also have insulative properties. Examples of suitable organic binders include latexes, such as styrene-butadiene latex and acrylic latex, starch, such as ungelatinized starch, polyvinyl alcohol, polyvinyl acetate, and mixtures and combinations thereof.

The filler of the composite adhesive layer 28 may be an organic filler, an inorganic filler, or a combination of organic and inorganic fillers. Organic fillers include hard organic fillers and soft organic fillers. Examples of suitable hard organic fillers include sawdust and ground wood. Examples of suitable soft organic fillers include cellulose pulp, pearl starch, synthetic fiber (e.g., rayon fiber), gluten feed, corn seed skin, and kenaf core (a plant material). Examples of suitable inorganic fillers include calcium carbonate, clay, pearlite, ceramic particles, gypsum and plaster. For example, organic filler may comprise 2 to 70 percent by weight of the composite adhesive layer 28 and inorganic filler may comprise 0 to 30 percent by weight of the composite adhesive layer 28.

All or a portion of the filler may have a relatively high particle size (e.g., 500 microns or more). The use of high particle size filler material may increase the thickness $T_A$ of the adhesive layer 28, thereby acting as a spacer that improves the insulative properties of the adhesive layer 28. For example, the adhesive layer 28 may be formed as a composite material that includes an organic binder and a hard organic filler, such as sawdust, that has an average particle size of at least 500 microns, such as about 1000 to about 2000 microns.

In one particular aspect, the adhesive layer 28 may be a foam. The foam may be formed by mechanically whipping the components of the adhesive layer 28 prior to application. Optionally, a foam forming agent may be included in the adhesive layer formulation to promote foam formation. As one example, 10 to 60 percent of the foam of the adhesive layer 28 may be open voids, thereby facilitating the absorption of moisture from the external surface 40 of the beverage container 10. As another example, 10 to 30 percent of the foam of the adhesive layer 28 may be open voids.

In another particular aspect, the adhesive layer 28 may be formed from a binder-filler formulation, as described herein, wherein the formulation has a pseudoplasticity index in the range of 0.3 to 0.5. Such a range provides the adhesive layer 28 with a sufficient minimum thickness $T_A$, while preserving the ability to apply the formulation at a low viscosity. For example, the formulation may have a low shear viscosity in the range of 2,000 to 50,000 centipoises and a high shear viscosity in the range of 100 to 5,000 centipoises.

As one option, the adhesive layer 28 may additionally include a plasticizer. The plasticizer may comprise 0.5 to 10 percent by weight of the composite adhesive layer 28. Examples of suitable plasticizers include sorbitol, Emtal emulsified fatty acids and glycerine.

As another option, the adhesive layer 28 may additionally include a sodium silicate, which may act as a filler, but is believed to aid in binding and curing of the binder by rapidly increasing viscosity of the binder during the drying process. The sodium silicate may comprise 0 to 15 percent by weight of the adhesive layer 28, such as about 1 to about 5 percent by weight of the adhesive layer 28.

Those skilled in the art will appreciate that, after initial processing, the adhesive layer 28 may maintain an equilibrium moisture content of about 10 to 15 percent by weight.

At this point, those skilled in the art will appreciate that the material that forms the adhesive layer may be formulated to be biodegradable.

EXAMPLES

Examples 1-4

Four sample composite adhesive materials (Nos. 1-4) suitable for forming the adhesive layer 28 were prepared. The formulations are provided in Table 1.

TABLE 1

| Material | Parts by Weight | | | | Component |
| --- | --- | --- | --- | --- | --- |
| | No. 1 | No. 2 | No. 3 | No. 4 | |
| sawdust | 15 | 15 | 15 | 15 | FILLER |
| sodium silicate | 2 | 2 | | | BINDER |
| calcium carbonate | 0 | 20 | 15 | 15 | FILLER |
| clay @40% | 0 | 20 | 15 | 15 | FILLER |
| latex SBR @40% | 20 | 20 | 20 | 75 | BINDER |
| starch modified | 30 | 30 | 15 | 15 | |
| pearl starch | 20 | 20 | 20 | 100 | BINDER |
| polyvinyl alcohol | 0 | 5 | 10 | 10 | BINDER |
| sorbitol | 5 | 2 | 0 | | PLASTICIZER |
| Emtal emulsified fatty acids@40% | 5 | 5 | 5 | 5 | PLASTICIZER |
| glycerine | 0 | 0 | 5 | 5 | PLASTICIZER |
| Safoam FPN3 | 1 | 1 | 1 | 1 | FOAMING AGENT |
| Triton 100 | 0.5 | 0.5 | 0.5 | | SURFACTANT |
| pearlite | | | 1 | 3 | FILLER |
| cellulosic insulation (recycled newsprint) | 0 | 0 | 2 | 2 | FILLER |

Formulation Nos. 1-4 were mechanically whipped to form a foam having a pseudoplasticity index in the range of about 0.3 to about 0.5.

Additional formulations for forming the adhesive layer 28, as well as methods suitable for forming the side wall 12, are disclosed in U.S. Ser. No. 61/175,569 filed on May 5, 2009, the entire contents of which are incorporated herein by reference.

Example 5

A 21-ounce beverage cup was constructed having a side wall and a bottom wall. The side wall was prepared as described above using adhesive formulation No. 1 (Example 1, above) sandwiched between a first, inner layer of SBS paperboard having a basis weight of 180 pounds per 3000 square feet and a thickness of 16 points and a second, outer layer of SBS paperboard having a basis weight of 150 pounds per 3000 square feet and a thickness of 14 points. The adhesive formulation covered about 100 percent of the inner surface of the second layer and resulted in an adhesive layer having a thickness of about 0.5 millimeters. The first layer had an inner surface coated with a 1 mil layer of polyethylene. The external surface of the cup had a surface area of 300 square centimeters.

Figure 4:
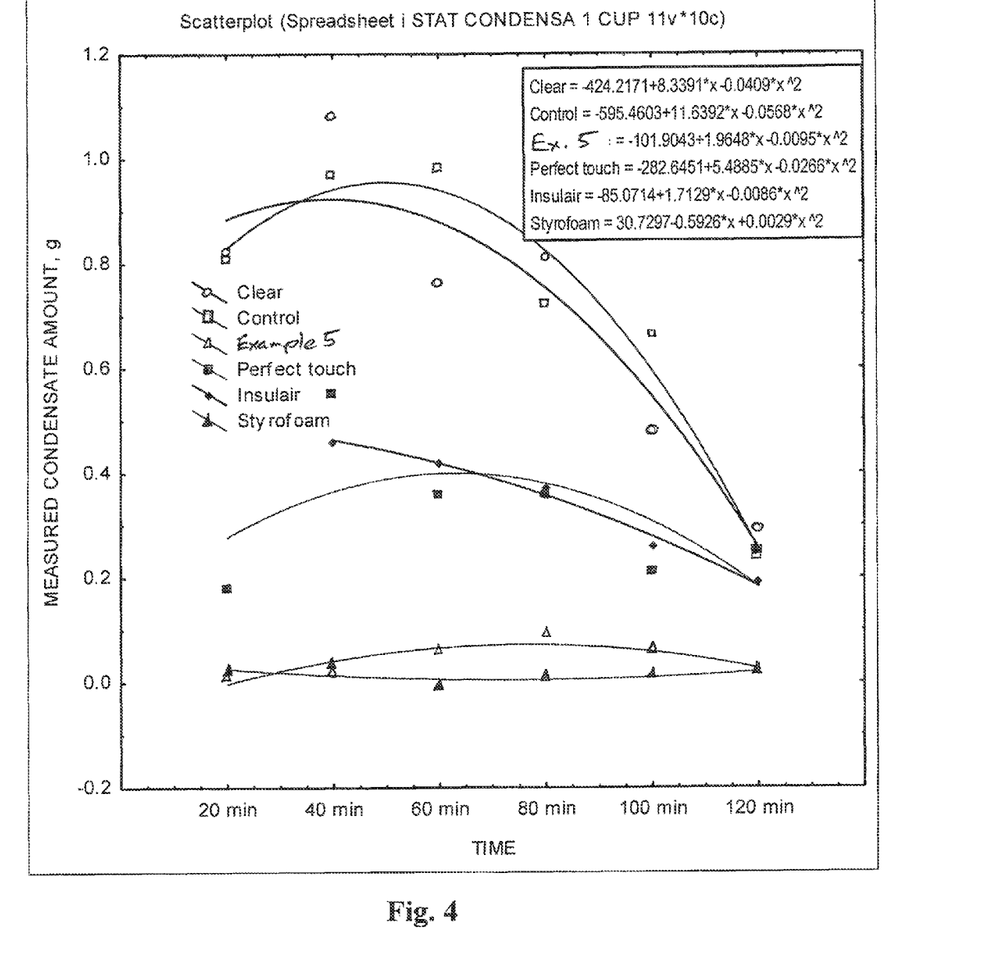
FIG. 4 is a graphical illustration of condensate formation versus time on a beverage container in accordance with one aspect of the disclosure.

The cup was positioned in a controlled atmosphere that was maintained at an ambient temperature of about 73° F. and about 50 percent relative humidity. With the cup in the controlled atmosphere, 15.75 ounces of an ice-water mixture was added to the cup and a timer was activated. Every twenty minutes for two hours, the accumulated surface condensation was wiped away from the external surface of the cup with a new absorbent cloth and the mass of the condensate collected on the cloth was determined (i.e., mass of cloth after wiping minus mass of cloth before wiping). The results are plotted in FIG. 4 as the "Example 5" data points, wherein each data point is indicative of the amount of surface condensation collected during a 20 minute period.

As used herein, "surface condensation" refers to condensation that forms on the external surface of a container, and that is capable of being wiped away from the external surface of the container. Surface condensation generally does not include condensation that has formed on or inside the external surface of a container, and that has been absorbed by the container in a manner the prevents or inhibits one's ability to wipe away the condensation. However, it should be appreciate that while wiping away surface condensation from the external surface, a certain negligible amount of internal condensation may also be collected due to, for example, capillary action.

For comparison, the same condensate formation test was also performed on a clear polyethylene terephthalate plastic cup ("Clear"), a single-ply paperboard cup coated on both sides with polyethylene ("Control"), a PERFECT TOUCH brand cup ("Perfect touch") made from polymeric foam available from Georgia Pacific, an INSULAIR brand cup ("Insulair") available from Insulair, Inc. of Veralis, Calif., and a cup formed from SYTROFOAM ("Styrofoam"). All comparison cups also had an external surface area of about 300 square centimeters. The comparative results are also plotted in FIG. 4.

Example 6

Figure 5:
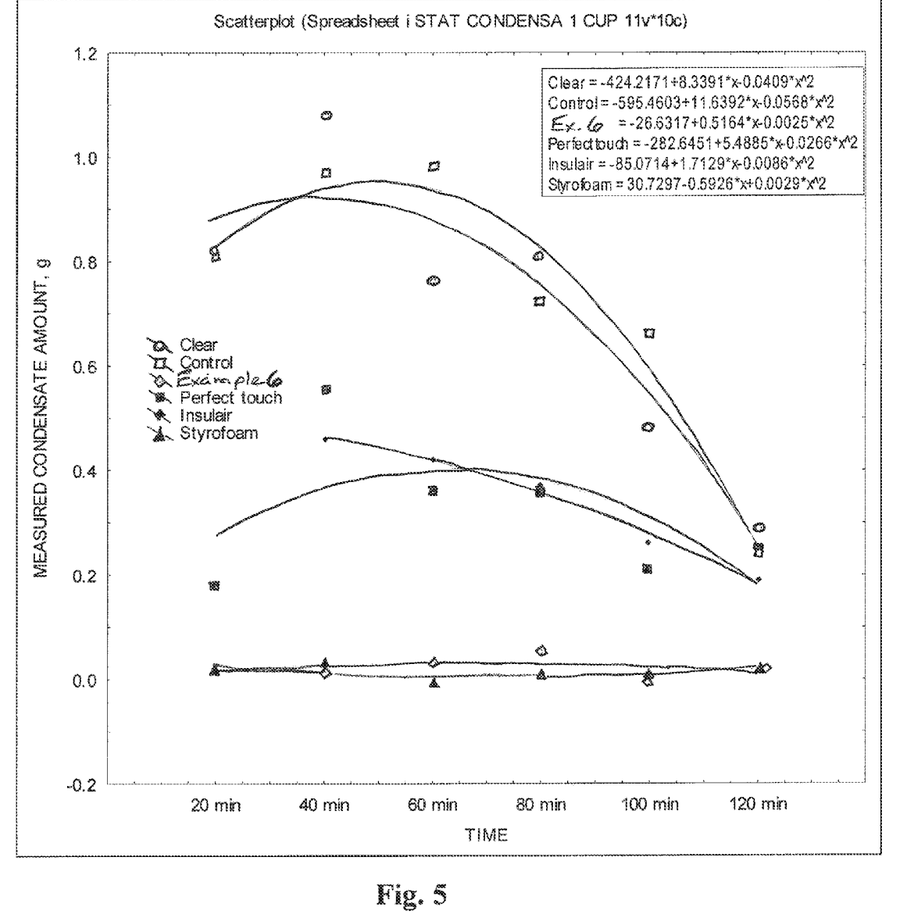
FIG. 5 is a graphical illustration of condensate formation versus time on a beverage container having an embossed external surface in accordance with another aspect of the disclosure.

A 21-ounce beverage cup was constructed and tested in the manner described above in Example 5, except that the external surface of the cup was embossed with a checkered pattern. The results are plotted in FIG. 5 as the "Example 6" data points, together with the same comparative results shown in FIG. 4.

Example 7

Figure 6:
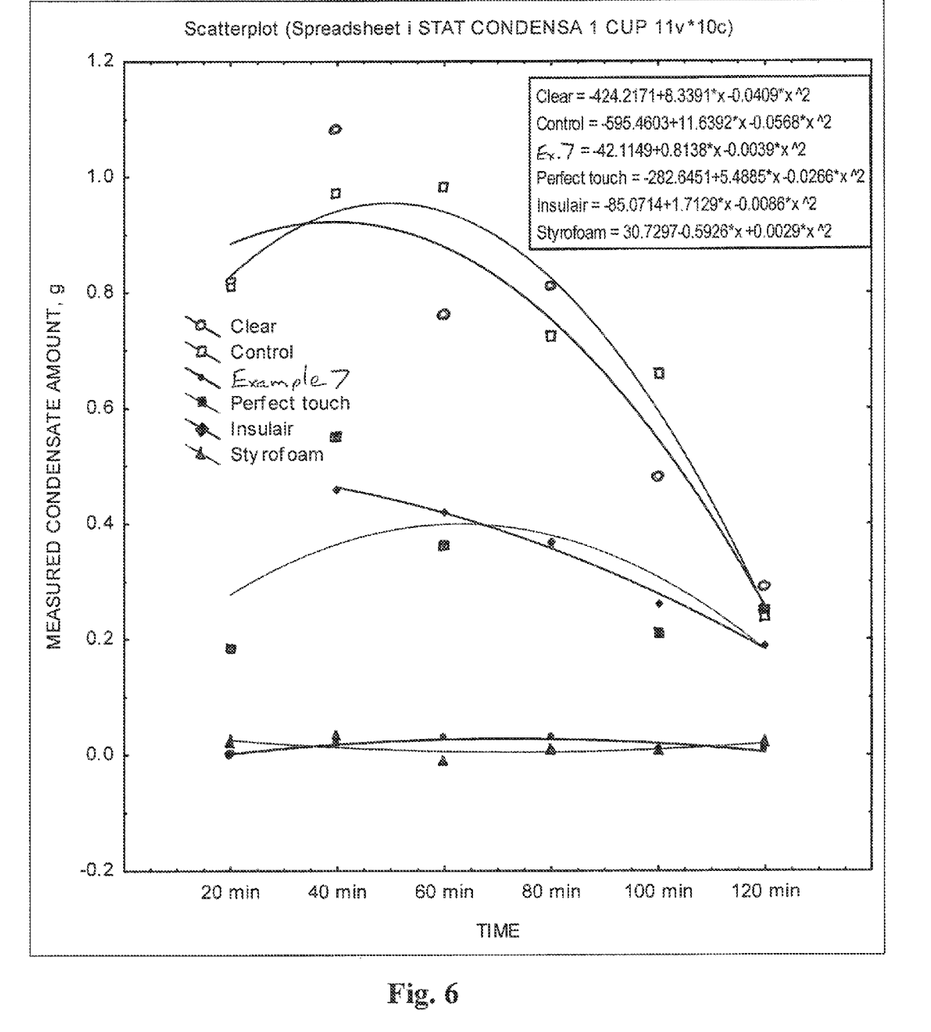
FIG. 6 is a graphical illustration of condensate formation versus time on a beverage container having a wood-containing outer layer in accordance with yet another aspect of the disclosure.

A 21-ounce beverage cup was constructed and tested in the manner described above in connection with Example 5, except that the second, outer layer included ground wood particles with particle sizes ranging from about 100 to about 1000 microns, thereby resulting in a board having a basis weight of about 180 pounds per 3000 square feet. The test results are plotted in FIG. 6 as the "Example 7" data points, together with the same comparative results shown in FIGS. 4 and 5.

Example 8

Figure 7:
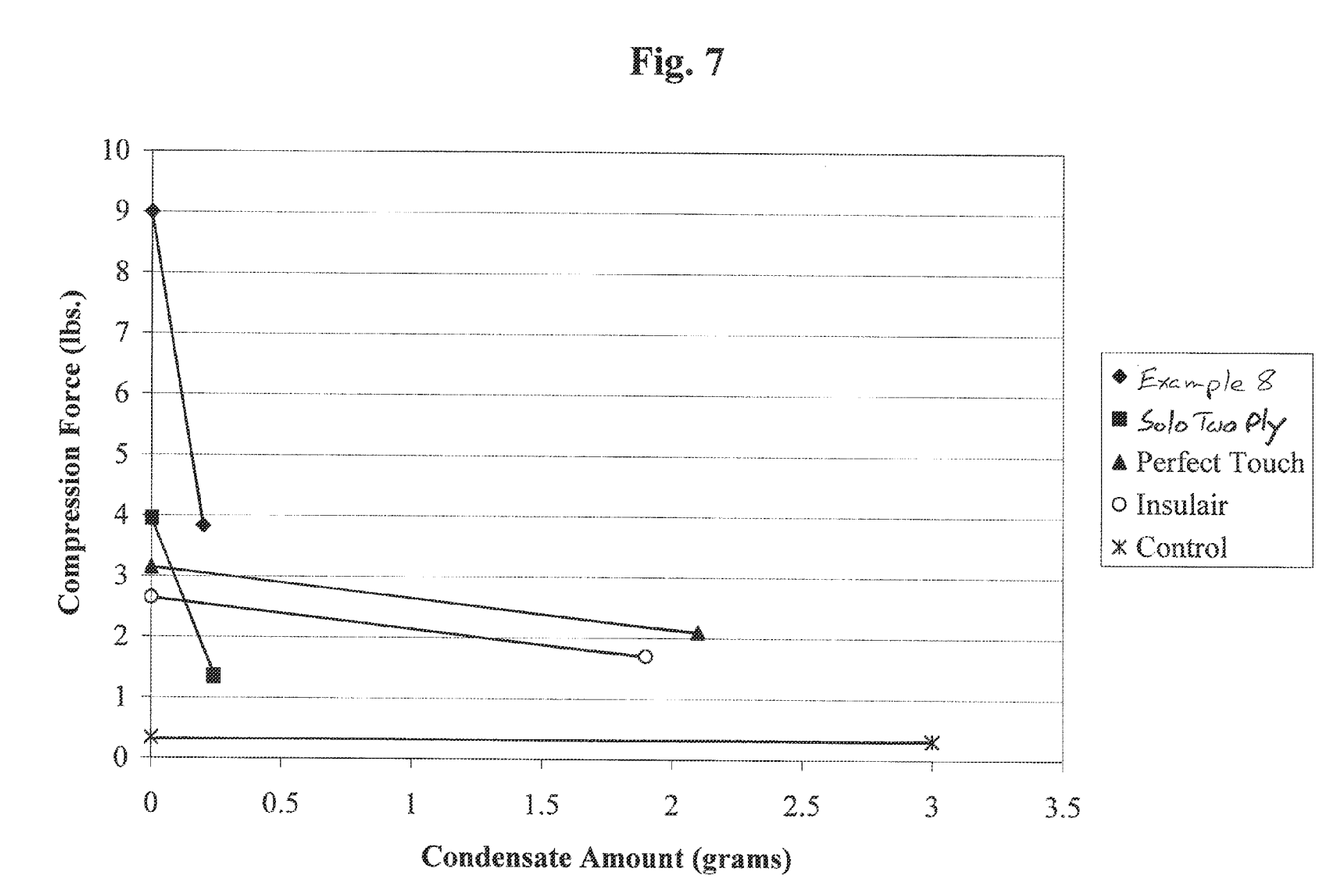
FIG. 7 is a graphical illustration of compression force versus condensate formation on the beverage container of FIG. 5.

The 21-ounce beverage cup Example 6 was tested for compression strength, both before the introduction of the ice-water mixture and immediately after two hours with the ice-water mixture. The compression force was measured at 5 percent deformation with the cup in a horizontal configuration (i.e., perpendicular to the vertical axis of the cup) using an INSTRON brand compression testing machine, available from Illinois Tool Works, Inc. of Glenview, Ill. The results are provided in Table 2 and are plotted in FIG. 7 (the "Example 8" data points) versus total condensate formation after 2 hours with the ice-water mixture.

TABLE 2

| Sample | Initial Compression Strength (lbs.) | After 2 Hours With Ice Water | |
|---|---|---|---|
| | | Compression Strength (lbs.) | Condensate Formation (g) |
| Double Wall | 9.00 | 3.83 | 0.20 |
| Solo Two Ply | 3.95 | 1.35 | 0.24 |
| Perfect Touch | 3.15 | 2.10 | 2.10 |
| Insulair | 2.65 | 1.70 | 1.90 |
| Control | 0.34 | 0.31 | 3.00 |

For comparison, the same compression strength test was performed on the Perfect Touch, Insulair and Control cups used for comparison in Examples 5-7, as well as on a large two-ply cup ("Solo Two Ply") sold under the SOLO brand name by the Solo Cup Company of Chicago, Ill. The results of the comparative tests are also provided in FIG. 7.

Accordingly, beverage containers formed in accordance with the present disclosure exhibit surprisingly low surface condensation formation, similar to STYROFOAM cups, but may be biodegradable, unlike STYROFOAM cups. Furthermore, beverage containers formed in accordance with the present disclosure maintain significantly high compression force (e.g., greater than 2.5 pounds), even after holding a cold beverage for 2 hours.

Although various aspects of the disclosed paperboard-based beverage container have been shown and described, modifications may occur to those skilled in the art upon reading the specification. The present application includes such modifications and is limited only by the scope of the claims.

What is claimed is:

1. A container comprising:
   at least one wall that defines an internal volume and an opening into said internal volume, said wall defining an internal surface and an external surface and being formed as a layered structure comprising a first layer, a second layer that comprises paperboard and defines said external surface, and an adhesive layer disposed between said first layer and said second layer,
   wherein at most 0.15 grams of condensation forms on said external surface per 300 square centimeters of said external surface during a 20-minute interval, said 20-minute interval beginning upon filling 75 percent of said internal volume with a liquid maintained at a temperature of about 32° F. while said filled container is exposed to an ambient temperature of about 73° F. and about 50 percent relative humidity.

2. The container of claim 1 wherein at most 0.10 grams of condensation forms on said external surface per 300 square centimeters of said external surface during said 20-minute interval.

3. The container of claim 1 wherein at most 0.05 grams of condensation forms on said external surface per 300 square centimeters of said external surface during said 20-minute interval.

4. The container of claim 1 wherein said adhesive layer is a foam.

5. The container of claim 4 wherein 10 to 60 percent of said foam is comprised of open voids.

6. The container of claim 1 wherein said adhesive layer includes sawdust and a binder.

7. The container of claim 6 wherein said sawdust has an average particle size of at least 100 microns.

8. The container of claim 6 wherein said sawdust has an average particle size of at least 1000 microns.

9. The container of claim 6 wherein said binder comprises latex.

10. The container of claim 6 wherein said binder comprises starch.

11. The container of claim 1 wherein said adhesive layer comprises 2 to 70 percent by weight filler and 8 to 70 percent by weight organic binder.

12. The container of claim 11 wherein said filler comprises an organic filler.

13. The container of claim 12 wherein said organic filler is selected from the group consisting of sawdust, ground wood, cellulose pulp, pearl starch, gluten feed, corn seed skin, kenaf core and combinations thereof.

14. The container of claim 12 wherein said organic filler comprises a hard organic filler.

15. The container of claim 11 wherein said adhesive layer further comprises 1 to 15 percent by weight sodium silicate.

16. The container of claim 11 wherein said adhesive layer further comprises 0.5 to 10 percent by weight plasticizer.

17. The container of claim 11 wherein said adhesive layer has an equilibrium moisture content of about 10 to 15 percent by weight.

18. The container of claim 1 wherein said adhesive layer has a thickness of 0.05 to 5 millimeters.

19. The container of claim 1 wherein said second layer has an average porosity of 20 to 1000 Gurley units.

20. The container of claim 1 wherein said second layer has an average porosity of 20 to 150 Gurley units.

21. The container of claim 1 wherein said second layer includes an inner surface and an outer surface, said outer surface defining said external surface, and wherein inner surface has a first Hercules sizing and said outer surface has a second Hercules sizing, said second Hercules sizing being greater than said first Hercules sizing.

22. The container of claim 21 wherein first Hercules sizing is in a range from about 30 to about 80 Hercules units, and wherein said second Hercules sizing is in a range from about 100 to about 150 Hercules units.

23. The container of claim 1 wherein said adhesive layer has a first insulative R-value and said second layer has a second insulative R-value, and wherein said first R-value is greater than said second R-value.

24. The container of claim 1 wherein said second layer has an inner surface and an outer surface, said outer surface defining said external surface, and wherein said adhesive layer is connected to said inner surface and covers 20 to 80 percent of said inner surface.

25. The container of claim 24 wherein said inner surface has a first Gurley porosity and said outer surface has a second Gurley porosity, and wherein said second Gurley porosity is greater than said first Gurley porosity.

26. The container of claim 24 wherein said inner surface has a porosity of about 20 Gurley units and said outer surface has a porosity of about 40 Gurley units.

27. A container comprising:
   at least one wall that defines an internal volume and an opening into said internal volume, said wall defining an internal surface and an external surface and being formed as a layered structure comprising a first layer, a second layer that comprises paperboard and defines said external surface, and an adhesive layer disposed between said first layer and said second layer,
   wherein at most 0.4 grams of condensation forms on said external surface per 300 square centimeters of said external surface during a 40-minute interval, said 40-minute interval beginning upon filling 75 percent of said internal volume with a liquid maintained at a temperature of about 32° F. while said filled container is exposed to an ambient temperature of about 73° F. and about 50 percent relative humidity.

28. The container of claim 27 wherein at most 0.3 grams of condensation forms on said external surface per 300 square centimeters of said external surface during said 40-minute interval.

29. The container of claim 27 wherein at most 0.2 grams of condensation forms on said external surface per 300 square centimeters of said external surface during said 40-minute interval.

30. The container of claim 27 wherein at most 0.1 grams of condensation forms on said external surface per 300 square centimeters of said external surface during said 40-minute interval.

31. A container comprising:
at least one wall that defines an internal volume and an opening into said internal volume, said wall defining an internal surface and an external surface and being formed as a layered structure comprising a first layer, a second layer that comprises paperboard and defines said external surface, and an adhesive layer disposed between said first layer and said second layer,
wherein at most 0.3 grams of condensation forms on said external surface per 300 square centimeters of said external surface during a 20-minute interval, said 20-minute interval beginning 20 minutes after filling 75 percent of said internal volume with a liquid maintained at a temperature of about 32° F. while said filled container is exposed to an ambient temperature of about 73° F. and about 50 percent relative humidity.

32. The container of claim 31 wherein at most 0.2 grams of condensation forms on said external surface per 300 square centimeters of said external surface during said 20-minute interval.

33. The container of claim 31 wherein at most 0.1 grams of condensation forms on said external surface per 300 square centimeters of said external surface during said 20-minute interval.

34. A method for making a beverage container comprising the steps of:
providing a first layer of paperboard and a second layer of paperboard;
positioning an adhesive material between said first and second layers to form a layered structure, said adhesive material having a pseudoplasticity index in the range of about 0.3 to about 0.5;
shaping said layered structure to define an internal volume and an opening into
said internal volume, said layered structure having an internal surface and an external surface; and
drying said adhesive material,
wherein at most 0.15 grams of condensation forms on said external surface per 300 square centimeters of said external surface during a 20-minute interval, said 20-minute interval beginning upon filling 75 percent of said internal volume with a liquid maintained at a temperature of about 32° F. while said filled container is exposed to an ambient temperature of about 73° F. and about 50 percent relative humidity.

35. A container comprising:
at least one wall that defines a vertical axis, an internal volume and an opening into said internal volume, said wall including an internal surface and an external surface,
wherein at most 0.5 grams of condensation forms on said external surface per 300 square centimeters of said external surface during a 2 hour interval, said 2 hour interval beginning upon filling 75 percent of said internal volume with a liquid maintained at a temperature of about 32° F. while said filled container is exposed to an ambient temperature of about 73° F. and about 50 percent relative humidity, and
wherein said container has a compression force of at least 2.5 pounds immediately after said 2 hour interval, said compression force being measured at 5 percent deformation in a direction perpendicular to said vertical axis.

36. The container of claim 35 wherein said wall is formed as a layered structure comprising a first layer, a second layer that comprises paperboard and defines said external surface, and an adhesive layer disposed between said first layer and said second layer.

37. The container of claim 36 wherein said adhesive layer comprises an organic filler and a binder.

38. The container of claim 37 wherein said binder comprises latex.

39. The container of claim 37 wherein said organic filler is selected from the group consisting of sawdust, ground wood, cellulose pulp, pearl starch, gluten feed, corn seed skin, kenaf core and combinations thereof.

40. The container of claim 35 wherein at most 0.4 grams of condensation forms on said external surface per 300 square centimeters of said external surface during said 2 hour interval.

41. The container of claim 35 wherein at most 0.3 grams of condensation forms on said external surface per 300 square centimeters of said external surface during said 2 hour interval.

42. The container of claim 35 wherein at most 0.2 grams of condensation forms on said external surface per 300 square centimeters of said external surface during said 2 hour interval.

43. The container of claim 35 wherein said compression force is at least 2.8 pounds immediately after said 2 hour interval.

44. The container of claim 35 wherein said compression force is at least 3.0 pounds immediately after said 2 hour interval.

45. The container of claim 35 wherein said compression force is at least 3.5 pounds immediately after said 2 hour interval.

46. The container of claim 35 wherein said compression force is at least 3.8 pounds immediately after said 2 hour interval.

47. The container of claim 35 wherein at most 0.3 grams of condensation forms on said external surface per 300 square centimeters of said external surface during said 2 hour interval, and wherein said compression force is at least 3.0 pounds immediately after said 2 hour interval.

* * * * *